United States Patent [19]
Cohn

[11] 3,883,805
[45] May 13, 1975

[54] DETERMINATION OF THE SUSCEPTIBILITY OF SEMICONDUCTOR DEVICES TO THERMAL SECOND BREAKDOWN

[75] Inventor: Norman S. Cohn, Baltimore, Md.

[73] Assignee: The United States of America as represented by the Secretary of the Navy, Washington, D.C.

[22] Filed: Mar. 7, 1974

[21] Appl. No.: 449,187

[52] U.S. Cl. .......................... 324/158 D; 324/158 T
[51] Int. Cl. ............................................. G01r 31/26
[58] Field of Search ........ 324/158 D, 158 T, 158 R; 29/574

[56] References Cited
OTHER PUBLICATIONS

Schafft, H. A.; "Second Breakdown . . . "; Proc. of the IEEE; Aug. 1967; pg. 1272–1288.

Primary Examiner—Alfred E. Smith
Assistant Examiner—Ernest F. Karlsen
Attorney, Agent, or Firm—R. S. Sciascia; J. A. Cooke; W. W. Cochran

[57] ABSTRACT

A method for determining the susceptibility of semiconductor devices to damage from an Electro-Magnetic Pulse (EMP) due to induced thermal second breakdown. The method can be used as a non-destructive screening test. It is based on the increase in junction reverse breakdown voltage with temperature and can be used to find the most EMP resistant devices of a given device type.

4 Claims, 5 Drawing Figures

DETERMINATION OF THE SUSCEPTIBILITY OF SEMICONDUCTOR DEVICES TO THERMAL SECOND BREAKDOWN

BACKGROUND OF THE INVENTION

The present invention relates generally to measuring and testing and more particularly to a method of determining the susceptibility of semiconductor devices to thermal second breakdown.

Semiconductor devices are subject to damage by a phenomenon known as thermal second breakdown when large power inputs are applied to their junctions. Under appropriate conditions, damage to the device can occur in less than a microsecond.

This phenomenon typically occurs when extremely large electromagnetic pulses (EMPs) are emitted by thermonuclear explosions. The electromagnetic pulses are picked up by the antenna of receivers and other sensitive electronic equipment and are transmitted to the inputs of these receivers and other devices where damage is caused. To prevent the transmittance of these pulses, diodes are normally connected between the antenna input to the device and ground potential in a reverse manner such that when voltages are produced at the antenna input which exceed the reverse breakdown voltage of diode, the remaining energy is shunted to ground. Voltage levels cannot then rise above the reverse breakdown voltage level thereby protecting the sensitive circuitry at the inputs of the receiver of other electronic devices.

However, protective diodes have a tendency to fail if the pulse applied is too great. If a diode fails (subjected to thermal second breakdown) it acts as an open circuit or reflects a reduced breakdown voltage, providing limited or no protection to the receiver. To provide reliable protection for receivers it would be beneficial to know in advance at what input energy level the diode would be likely to fail. The diodes which evidence the least amount of susceptibility to failure could then be chosen to provide the maximum amount of reliability to the protective system.

In addition, a screening test is needed to determine the susceptibility of semiconductor junctions in general which exist in a multitude of various semiconductor devices to determine their susceptibility to thermal second breakdown from a wide range of sources.

Presently, only two screening tests for submicrosecond thermal breakdown of these devices are known. The first method developed by D. C. Wunsch and R. R. Bell is set forth in an article in the IEEE Transactions in Nuclear Science 15, 6, pp. 244–259, Dec. 1968 entitled "Determination of Threshold Failure Levels of Semiconductor Diodes and Transistors Due to Voltage Pulses". According to that method a power level is calculated based on average device parameters with the assumption that all devices of a given device type fail at approximately the same level. The method thus makes no attempt to pick the most resistant devices of the group, and therefore fails as a viable screening test.

The second method developed by D. M. Tasca is set forth in the IEEE Transactions in Nuclear Science 19, 6, pp. 57–67, Dec. 1972 in an article entitled "Nondestructive Screening for Thermal Second Breakdown". The article discloses two alternative screening tests; an active one and a passive one. The active test is disclosed as follows: A semiconductor device can, under the proper conditions, be subject to second breakdown without sustaining damage. The method is, therefore, to pulse the device into the second breakdown state without damaging it, and to measure the energy required to do this. Those devices requiring the most energy to reach the second breakdown state are considered the most resistant to damage.

The test, however, has these disadvantages and limitations. First, the available technology is not yet advanced enough to produce the desired condition (i.e., second breakdown without damage) for a submicrosecond pulse. The experiment must therefore be performed in the microsecond time range with the results extrapolated to the submicrosecond time range. Thus a one to one correlation is not always observed due to changes in the second breakdown hot spot geometry which occur during the relatively large time interval between the long and short pulse width conditions. Perhaps an even more important problem with this method is its effect on the device's long term reliability. In fact, due to this screening test, damage has been manifested in a reduced second breakdown vulnerability level on subsequent test pulses. Another problem of the active test is that measurements can only be done by devising a special experimental technique for each device type of concern; a very time consuming procedure.

The passive test which Tasca suggests consists of measuring the forward voltage at a forward current of one milliamp. Tasca then determines that those devices with lower forward voltage are more resistant to damage. Although the test successfully separates the diodes of different junction areas very well, it does not do a satisfactory job of picking the most resistant devices of a given junction area. This is due to the lack of resolution of the instruments needed to resolve the very low second breakdown initiation energies.

SUMMARY OF THE INVENTION

The present invention overcomes the disadvantages and limitations of the prior art by providing a nondestructive screening test for determining the susceptibility of semiconductor devices to thermal second breakdown. The method relies on measuring a voltage rise at the device's terminals as a constant amplitude current pulse is applied thereto. From similar tests run on devices which were subjected to second breakdown, a correlation can be made between the device's susceptibility to thermal breakdown and the change in junction voltage due to the temperature rise caused at current restriction points by a standard current pulse. From this correlation, the least susceptible devices can be nondestructively selected from a group by merely measuring that change in junction voltage.

It is therefore the object of the present invention to provide an improved method for determining the susceptibility of semiconductor devices to thermal second breakdown.

It is also an object of the present invention to provide an accurate and dependable method for determining the susceptibility of semiconductor devices to thermal second breakdown.

Another object of the present invention is to provide a reliable method for determining the susceptibility of semiconductor devices to thermal second breakdown.

Another object of the invention is to provide a method for determining the susceptibility of semiconductor devices to thermal second breakdown which is simple and easy to perform with common laboratory testing equipment.

Other objects, advantages and novel features of the invention will become apparent from the following detailed description of the invention when considered in conjunction with the accompanying drawings wherein:

DETAILED DESCRIPTION OF THE PREFERRED EMBODIMENTS

Figure 1:
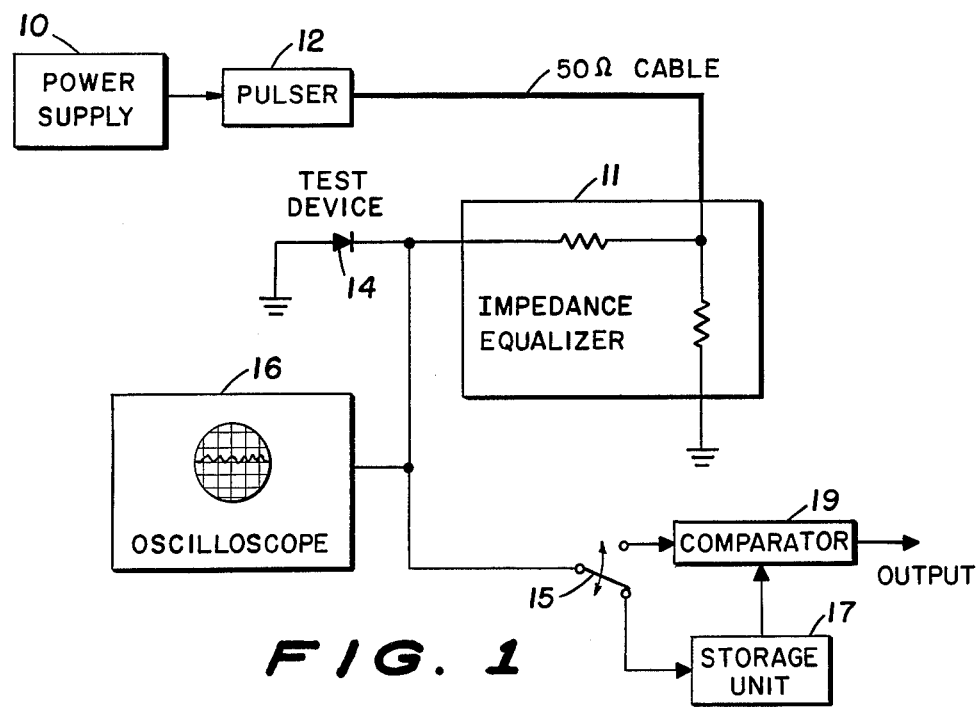
FIG. 1 is diagram of the device for carrying out the method of the preferred embodiment.
Figure 3:
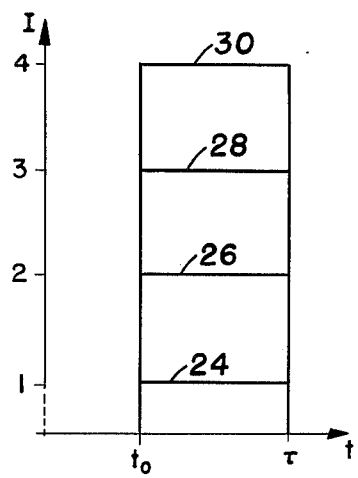
FIG. 3 is a current-time graph illustrating the current pulses applied to the test device.

FIG. 1 is a diagram of a test apparatus for carrying out the method of the present invention. The device consists of a power supply 10 and a pulser 12 designed to produce a series of constant current pulses 24, 26, 28 and 30 as shown in FIG. 3 each having different but constant current levels generated from time $t_o$ to Y. These constant current pulses are transmitted through a 50 ohm cable to an impedance equalizer 11. When the test device 14 is in avalanche condition and acts as a low resistance to ground, the 62 ohm resistor and the 200 ohm resistor work together in parallel to closely approximate 50 ohms of resistance. This bulk resistance which is nearly the same as the distributed resistance of the cable, suppresses reflections in the 50 ohm cable effectively absorbing spurious signals. Oscilloscope 16 is connected to measure the reaction of the test device to the constant current pulses described above. Also connected to the test device is a switch 15 for selectively shunting the detected data to either a shift register 17 or a comparator 19. Comparison of the voltage rise factors for the preliminary test samples stored in storage unit 17 with the voltage rise factors of semiconductor devices under test in comparator 19 indicates their susceptibility as disclosed more fully herein.

Figure 2:
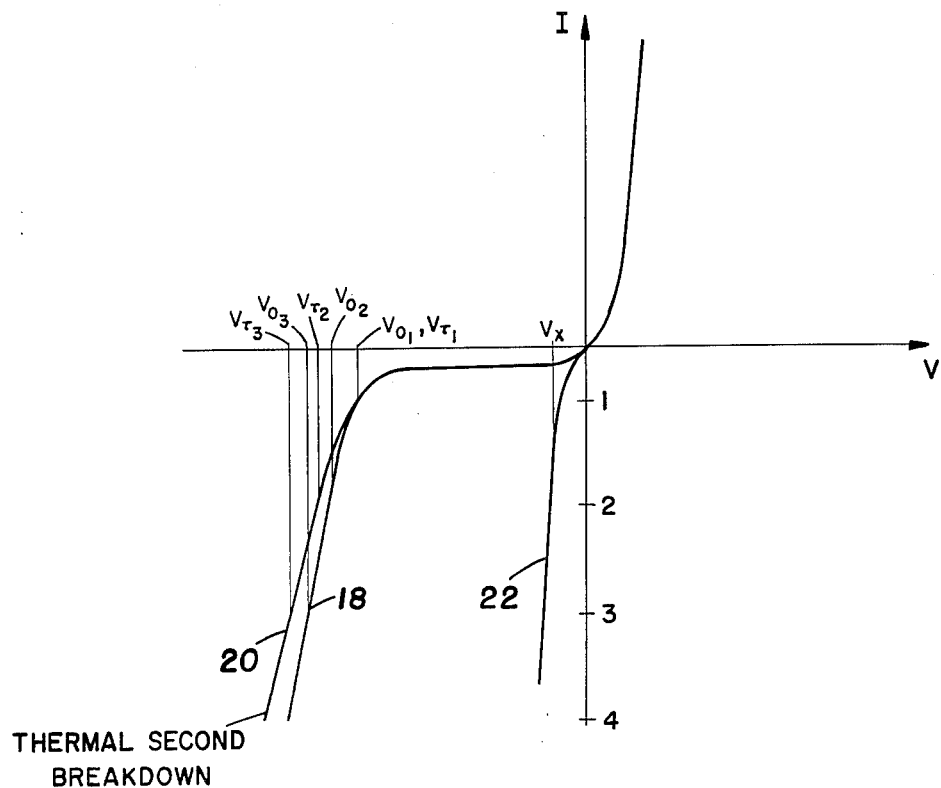
FIG. 2 is a voltage-current graph of the reaction of a typical test device.

FIG. 2 is a current, voltage diagram of the reaction of the test devices to the constant current pulses. The graph illustrates three separate curves 18, 20, and 22. Curve 18 represents the reaction of a typical test device such as a diode to the initial application (at time $t_o$) of the constant current pulses of FIG. 3 such that temperature resistance created at the semiconductor junction is not taken into account. Conversely, curve 20 represents the reaction of the same test device at the end (at time Y) of the constant current pulses of FIG. 3 such that temperature resistance created by the current pulse at the semiconductor junction is taken into account. Curve 22 is the reaction of a typical preliminary test sample after it has been exposed to thermal second breakdown.

The screening method of the present invention is based on tests indicating that the breakdown voltage of a semiconductor junction increases with the temperature of that junction. The voltage rise across a p-n junction in avalanche condition in response to a constant current pulse is therefore an indication of the temperature rise at the semiconductor junction.

The screening procedure requires that two preliminary destructive tests be made in order to obtain data from which conditions can be set up for nondestructive screening of specimens of a given type of diode or other test device.

Figure 4:
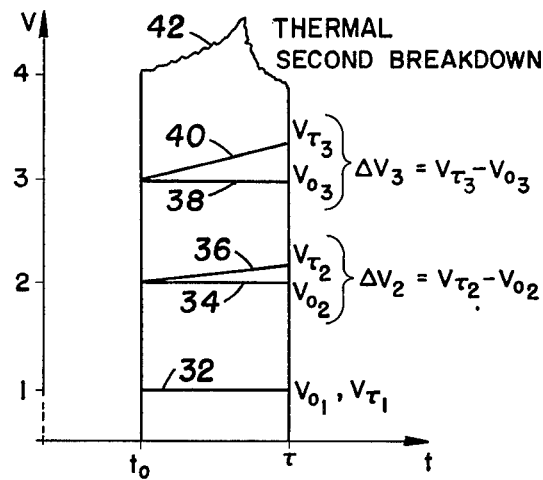
FIG. 4 is a voltage-time graph of the reaction of a typical test device to the current pulses of FIG. 3.

First, a small sample of diodes (five or six) must be pulsed to destruction as shown at 42, FIG. 4, in order to establish the magnitude of the threshold-damage current for the pulse width used in the screening procedure.

The second preliminary test requires a sample of about twenty test devices. Each test device is first given a nondestructive reverse current pulse in order to obtain its voltage rise factor. This rise factor is indicated by the magnitude of the rise in voltage across the semiconductor junction in response to a chosen constant current pulse divided by the magnitude of the voltage across the junction produced by a low level current pulse (e.g. a pulse having a magnitude just large enough to cause reverse breakdown). For example, the voltage rise factor for constant current pulse 26 as shown in FIG. 3 is equal to:

$\Delta V_2$ which is equal to $(V_{Y_2} - V_{o_2})$ where $V_{o_2}$ = the voltage across the test semiconductor junction at time $t_o$ in response to a current pulse 26 as shown in FIG. 3.

$V_{Y_2}$ = the voltage across the test semiconductor junction at time Y in response to a current pulse 26 as shown in FIG. 3.

Alternatively a different set of voltage rise factors could be expressed for constant current pulse 28 in the following manner:

$\Delta V_3$ which is equal to $(V_{Y_3} - V_{o_3})$.

The voltages $V_{Y_3}$ and $V_{o_3}$ are similar to $V_{Y_2}$ and $V_{o_2}$ respectively except they are in response to constant current pulse 28.

After a single set of voltage rise factors has been determined for each of the test devices for a given constant current pulse and stored in storage unit 17, each of the test devices is subjected to a destructive reverse current pulse having a magnitude determined by the initial preliminary test. Constant current pulse 30 as shown in FIG. 3 is an example of such a pulse which produces thermal second breakdown as shown by voltage response curve 42, FIG. 4. Thermal second breakdown is induced to obtain the test device's damage resistance factor which is a measure of the magnitude of its reverse breakdown voltage after being subjected to the destructive reverse current pulse. As disclosed in FIG. 2, this is equal to: $V_r$. This value is stored in storage unit 17 in a location corresponding to the voltage rise factor for each preliminary test device.

Figure 5:
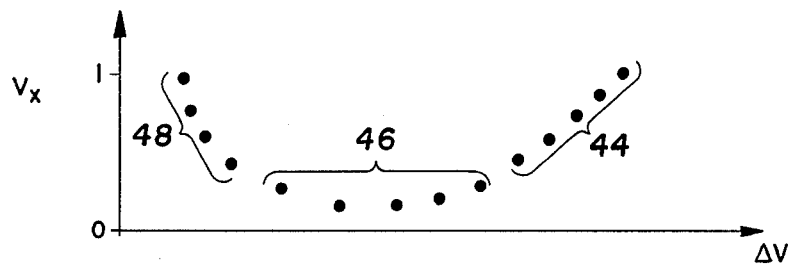
FIG. 5 is a graph illustrating the correlation between the voltage rise of the test device and damage.

FIG. 5 is a graph of voltage rise factors versus damage resistance factors for typical test devices to determine if a functional relationship exists between the plotted data. Normally a functional relationship can be found similar to the U shaped function of FIG. 5 indicating that those test devices having both high (data points 48) and low (data points 44) voltage rise factors are less susceptible to damage since they evidence high damage resistance factors.

The nondestructive screening of test devices of the same type can then proceed. The test devices are pulsed by a current pulse of the same magnitude as the preliminary test devices used to produce the voltage rise factors of FIG. 5. The voltage rise factors of the test devices are measured and compared in comparator 19 to indicate the corresponding damage resistance factor of the favorably compared preliminary test device so that the test semiconductor devices can be sorted into groups of relatively high and relatively low damage resistance to thereby indicate susceptibility.

A clear advantage of this screening procedure is that susceptibility of test devices to damage can be determined without any fear of inducing thermal breakdowns in the devices being tested. Also, test currents are being applied to the device in the same manner in which breakdowns are normally caused (i.e., by narrow pulse reverse currents) giving a more accurate indication of the true response of a test device when subjected to actual operating conditions. Furthermore, a relatively small number of preliminary test devices of any given type need be destroyed.

Obviously many modifications and variations of the present invention are possible in light of the above teachings.

For example, the screening procedure can be adapted to transistors by reverse-pulsing the emitter junction to obtain the voltage-rise factor. Either the gain or the emitter breakdown voltage can be used to obtain the damage-resistant factor.

It is therefore to be understood that within the scope of the appended claims the invention may be practiced otherwise than as specifically described.

I claim:

1. A method of determining the susceptibility of a semiconductor device to thermal second breakdown comprising the steps of:

measuring magnitudes of voltage rise factors for a set of preliminary test devices;

measuring magnitudes of damage resistance factors for said set of preliminary test devices;

measuring a magnitude of a voltage rise factor for said semiconductor device;

comparing said magnitude of said voltage rise factor of said semiconductor device to said magnitudes of said set of preliminary test devices to select the damage resistance factor of said semiconductor device from corresponding magnitudes of said compared voltage rise factors thereby indicating the susceptibility of said semiconductor device.

2. The method of claim 1 wherein said step of measuring the voltage rise factors for a set of preliminary test devices comprises the further steps of:

applying a constant current pulse to said preliminary test devices;

measuring the voltage rise of said preliminary test devices to the application of said constant current pulse.

3. The method of claim 1 wherein said step of measuring magnitudes of damage resistant factors for said set of preliminary test devices comprises the further steps of:

subjecting said preliminary test devices to thermal second breakdown;

measuring reverse breakdown voltage magnitudes for said preliminary test devices after said preliminary test devices have been subjected to said thermal second breakdown.

4. The method of claim 3 wherein said step of measuring the voltage rise factors for a set of preliminary test devices comprises the further steps of:

applying a constant current pulse to said preliminary test devices;

measuring the voltage rise of said preliminary test devices to the application of said constant current pulse.

* * * * *